July 10, 1934.  H. S. EADES  1,966,337
AUTOMATIC TAPPING MACHINE
Filed Dec. 12, 1931  3 Sheets-Sheet 1
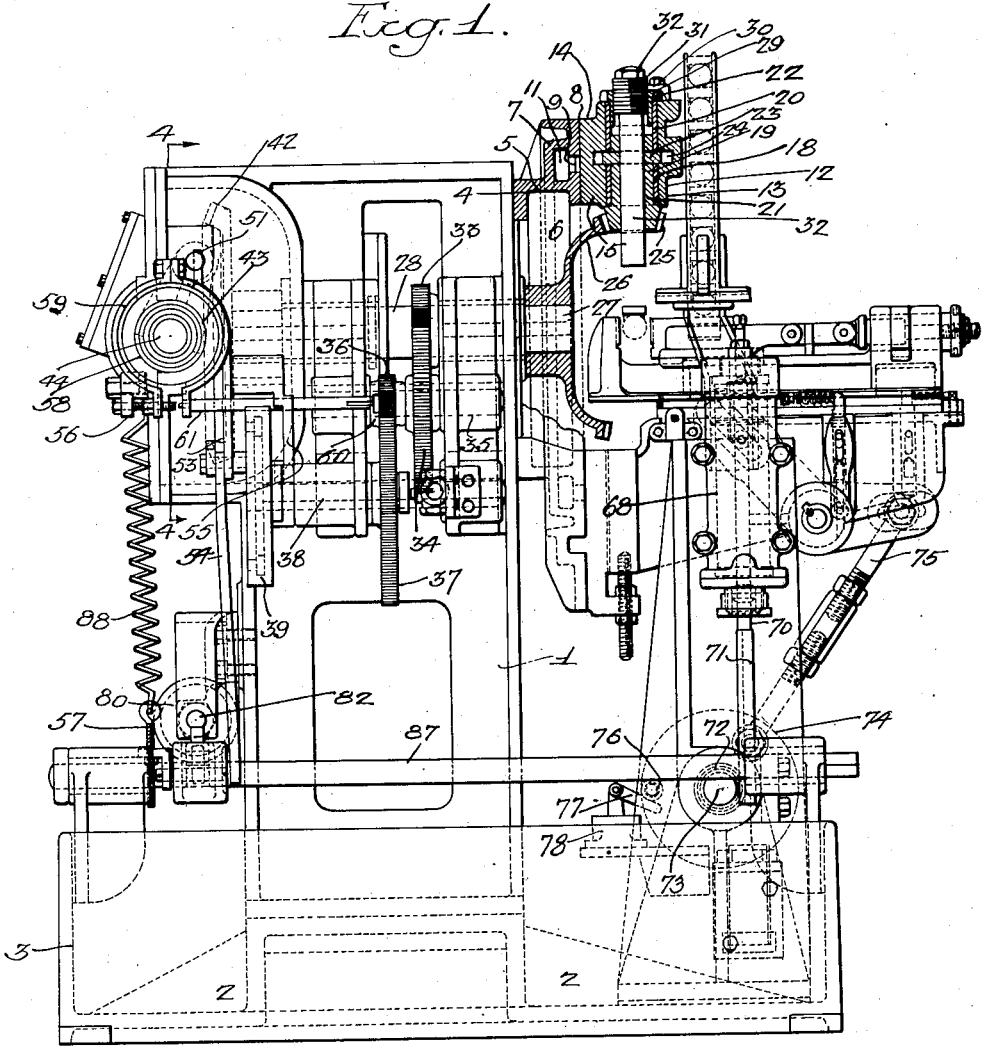

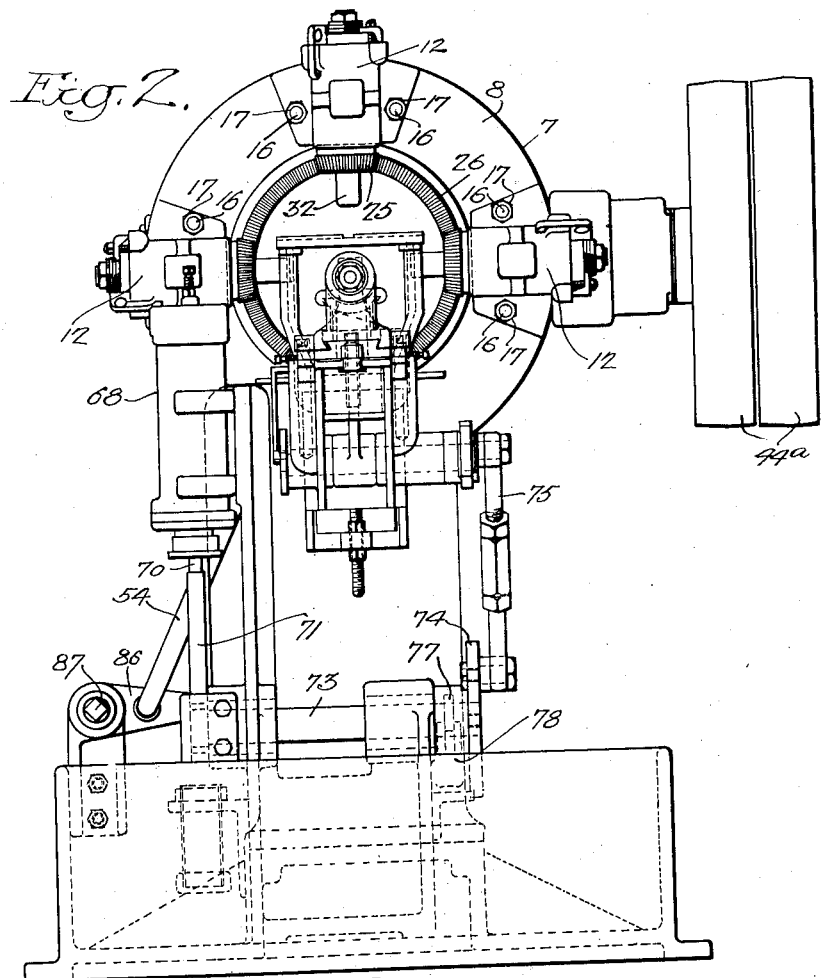
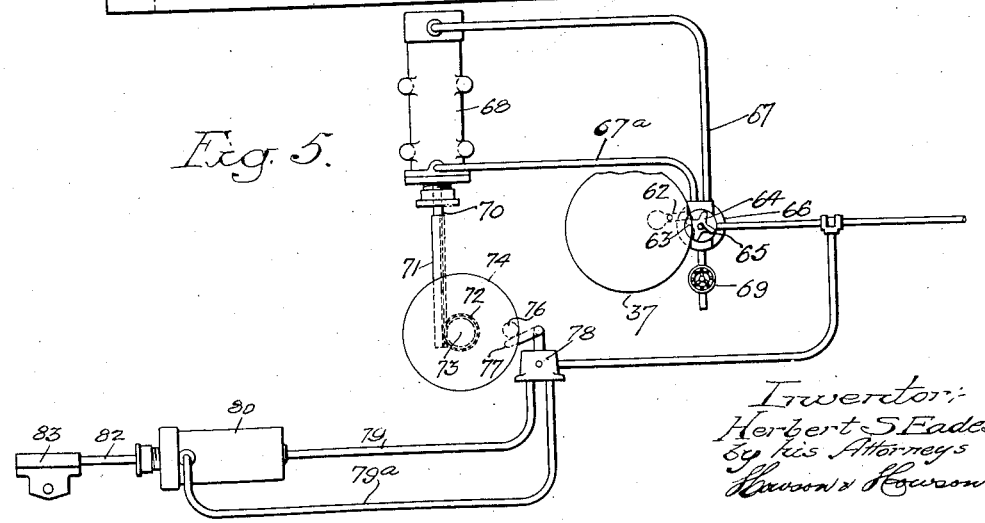

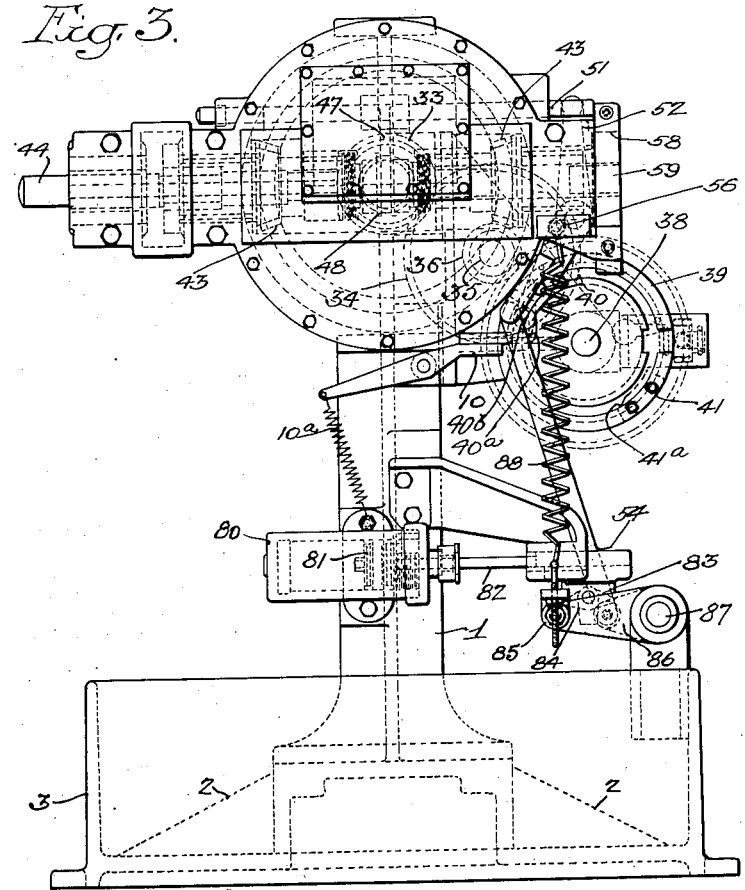
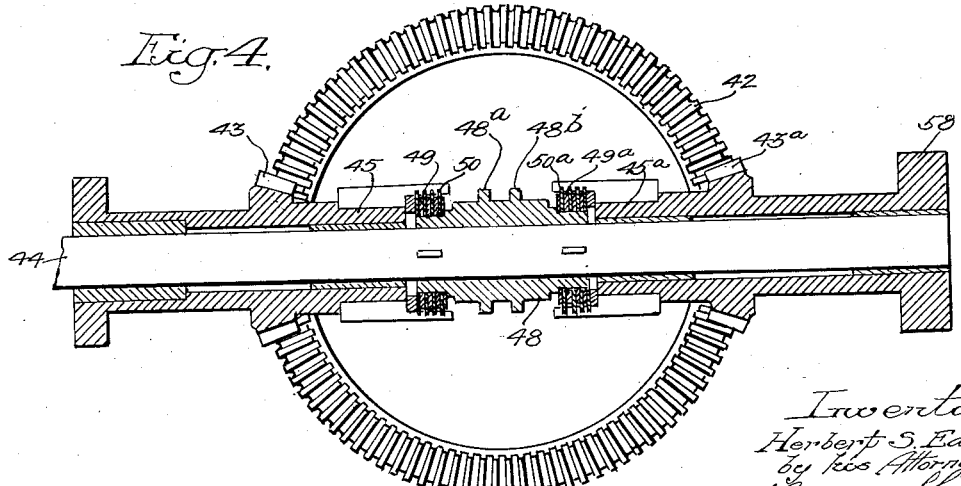

UNITED STATES PATENT OFFICE 1,966,337

AUTOMATIC TAPPING MACHINE

Herbert S. Eades, Pottstown, Pa., assignor to Pottstown Machine Company, Pottstown, Pa., a corporation of Pennsylvania Application December 12, 1931, Serial No. 580,681

16 Claims. (Cl. 10—131)

This invention relates to new and useful improvements in automatic machines having particular relation to reaming and tapping machines of the type disclosed in Patents Nos. 1,656,758, and 1,656,759, issued on January 17, 1928 to John R. Saylor of Pottstown, Pennsylvania.

In its broadest aspect, the object of my invention is to provide, in conjunction with an automatic machine of the character set forth, novel automatic means effecting a substantial reduction in the chucking and starting time adapted to coincide with the circular working cycle of the taps effected by the present day high spindle speeds.

Another object of the invention is to provide an automatic machine of the stated character whose chucking mechanism is operated by means of a hydraulic medium.

A more specific object of the invention is to provide an automatic reaming and tapping machine having a novel arrangement wherein both the pneumatic or hydraulic operated chucking and starting cylinders alternate in direction on successive operations, thus affording no wastage of pressure to return the piston to its initial position.

Another object of the invention is to provide a reaming and tapping machine of the character described having operatively associated means for reducing the time lost in the event of the jamming of a fitting in feeding.

Another object of the invention is to provide a machine of the character set forth wherein the number of moving parts is substantially reduced in contrast to machines of the stated character produced heretofore.

Another object of the invention is to provide a machine of the character described wherein every stroke of the operating cylinders is a definite productive working stroke.

Another object of the invention is to provide a machine wherein the speed of the chucking operation may be controlled at will.

Other features and details of the construction of my invention are set forth hereinafter and disclosed in the accompanying drawings, in which:

Figure 1 is a side elevational view of the machine constituting my invention;

Fig. 2 is a front elevational view of the disclosure of Fig. 1;

Fig. 3 is a rear elevation view of the tapping machine made in accordance with my invention;

Fig. 4 is a sectional view on line 4—4, Fig. 1;

Fig. 5 is a diagrammatic disclosure of the pneumatic or hydraulic system for actuating the various steps in the operation of the machine; and Figs. 6 and 7 are enlarged fragmentary views better illustrating the relative positions of the timing disk and the clutch actuating mechanism.

Present day developments in high speed steel taps and in the quality of castings, in many cases justify the use of cutting speeds which are materially greater than have been available heretofore. The resultant higher spindle speeds can, and are, being readily obtained with the use of the tapping machines of the conventional type covered by the above referred to patents issued to John R. Saylor, but in order to coincide with the shorter working cycle of the taps effected at the present higher spindle speeds, it is advantageous to effect a substantial reduction in the chucking and starting times of the various operations, and it is to the accomplishment of this purpose that the present invention is directed.

To briefly set forth the distinction between the present application and the above referred to patents, the essential details of magazine arrangement and reciprocating chucks have been retained and the present invention is directed basically to the means of reciprocating the chuck, and controlling the starting of the machine through its working cycle, which have been so modified and improved as to greatly benefit the machines commercially beyond question. In the present instance and in the manner disclosed hereinafter, the time, from the stopping of the taps until the operation is resumed after the discharge of a tapped fitting and the reception of a subsequent blank, may be readily reduced to a time of between one and two seconds faster than the all-mechanically driven types of chucking mechanism used heretofore, and obviously represents a high percentage gain in output where chucking and starting time constitute a substantial factor in the total time of the working cycle of the machine.

Referring now more particularly to the drawings, a vertical upright housing 1 rests on a base pad 2—2, integral with a receptacle 3 for holding coolant or other cutting compound. The front end of the machine has secured thereto an annular face plate 4 having an outwardly extending cylindrical portion 5 defining a space 6 and a laterally extending flange portion 7, the latter being provided with a smooth sliding surface 8 having an annular channel 9 provided with an enlarged base portion 11. A series of spindle heads 12, the number of which depends upon the number of holes to be simultaneously tapped or bored, comprises longitudinally extending cylindrical portions 13 and integral flange portions 14 and 15. The integral flange portions 14 and 15 are provided with plane surfaces adapted to slide over the face plate surface 8 and are secured thereto in any desired position by bolts 16 having one end thereof provided with head portions positioned in the annular recess 11 and the other end portion engaged by the clamp nut 17. The cylindrical portions 13, Fig. 1, of the spindle heads 12, are provided with longitudinally extending bores 18 which are provided in the present instance, with bushings 19 and 20 respectively. The longitudinal space residing inwardly of the said bushings 19 and 20 is partially closed at opposite ends by sleeve 21 and leader nut 22 respectively.

The inner sleeve 21 has rigidly secured thereto a ring 23 which is mounted in a recess 24 provided in the cylindrical portion 13 of the spindle heads 12, thereby preventing longitudinal movement of the sleeve 21. The end of the sleeve 21 terminates in a beveled pinion 25 which meshes with a cooperating beveled gear wheel 26 positioned in the space 6 defined by the cylindrical wall 5 and rigidly secured to an end portion 27 of a horizontally extending driving shaft 28.

The leader nut 22 is provided with a flanged portion 29 which is secured in position by a releasable clamp member 30. The leader nut 22 is further provided with a master thread which meshes with a correspondingly threaded portion 31 on a hollow screw surrounding a shank on, and keyed to, the outer end of a spindle 32. The inner end portion of the spindle 32 is splined to the revoluble sleeve 21 and may be provided with a tap or other cutting tool, as desired.

In the operation of the spindle head mechanism just described, when the shaft 28 is driven in one direction, the driving gear 26 is rotated to correspondingly revolve the cooperating pinions 25 which are revolubly mounted in the several spindle heads 12 thereby causing the turning of the several spindles 32. The rotation of each of the several spindles 32 causes the threaded portion 31 on the screw fastened thereto to have a longitudinal component of travel during the rotatable component just mentioned. Hence the several taps or other cutting tools may be moved inwardly or outwardly, depending upon the direction of rotation of the driving shaft 28.

A spur gear 33 is mounted upon the driving shaft 28 and arranged for rotation therewith, the said gear 33 being meshed with a low speed spur gear 34 of relatively larger diameter which is rigidly mounted upon a shaft 35. A spur gear 36 of relatively small diameter, is rigidly mounted upon the said shaft 35 and is meshed with a spur gear 37 of relatively large diameter mounted upon a shaft 38. A timing disk 39 is mounted on the outer extremity of the shaft 38 and arranged for rotation therewith, the said driving disk 39 being rotated by means of the spur gear train, previously described, through the driving shaft 28 of the machine. An adjustable reverse stop 40 is mounted on the timing disk 39 adjacent the periphery thereof and is provided with an extension 40a and a cam surface 40b, the purpose for which will be set forth hereinafter. A cam 41, the purpose for which will likewise be set forth hereinafter, is attached to the opposite face of timing disk 39.

At the rearward extremity of the driving shaft 28, I mount a second bevel driving gear 42 arranged for rotation with said shaft, the teeth of the said driving gear 42 being meshed with bevel pinions 43, 43a respectively, which are movably mounted about the driving shaft 44 by means of the sleeves 45, 45a to which said bevel pinions are secured. Connection from the drive shaft 44 to one or the other of the gears 43 is accomplished by means of a clutch mechanism comprising the yoke member 47 residing intermediate the collars 48a, 48b integral with spool 48 and mounted upon said drive shaft 44 and arranged for rotation therewith, and at the same time permitting of longitudinal movement of the said spool 48 with respect to the shaft 44. Forward or reverse motion is transmitted to the driving shaft 28 from the shaft 44 by means of the above described clutch mechanism, the longitudinal movement of the yoke 47 parallel to the shaft 44 sliding the said spool 48, to engage one or the other of the sets of clutch disks 49, 49a keyed to spool 48, with disks 50, 50a secured to the sleeves 45, 45a, imparting rotation thereto and in turn to the beveled gear wheels 43, 43a respectively mounted thereon and meshed in each instance with the driven bevel gear 42. In the present instance rotation is imparted to the drive shaft 44 by means of the tight and loose pulleys 44a suitably connected by a belt or other means to a source of rotative power. The movement of the yoke 47, residing intermediate the clutch collars 48a, 48b is effected by mounting the yoke upon a reciprocable horizontal rod 51 actuated by arm 52 of a shipper lever with three integral arms 52, 53 and 55, the aforesaid shipper lever being in turn actuated, for either forward or reverse operation by a link 54 attached at one end to the arm 53 and at the other end to the lever 86, and for movement from a reverse to a neutral position of yoke 47 by cam 41 engaging against a boss or pin substantially integral with arm 55, in a manner set forth in detail hereinafter.

Referring now particularly to Figs. 3 and 4 of the drawings, when the spool 48, yoke 47, shipper rod 51 and the upper end of the lever arm 52 are at the extreme leftward end of the path of travel thereof, the clutch disks 49 and 50 shown in Fig. 4 are engaged and move the spindles radially inward in direction.

In a similar manner, when the aforementioned spool, yoke, shipper rod and lever 52 are at the extreme end of travel in the opposite direction, the clutch disks 49a and 50a are engaged and operate to move the spindles in a reverse or radially outward direction, and when the clutch disk engaging mechanism described above is in a midway or neutral position, neither set of the clutch disks is engaged, and the spindles become inoperative.

A spring 88 is attached at its upper end to a bolt 56 secured to the machine, the lower end of the said spring being secured to a hook 57 which is, in turn, secured to a start lever 86. The spring 88 in the present instance exerts a continuous upward pull on the lever 86 and the link 54 which tends to pivot the shipper lever mechanism, comprising members 52, 53 and 55 respectively, in a clockwise direction, to engage the clutch disks 49a and 50a, thus moving the spindles in a reverse or radially outward direction.

A piston 81 operating in conjunction with a cylinder 80 actuates a piston rod 82 terminating at its outer extremity in a wedge 83, the said wedge 83 having an angular face 84 which, in the course of the working stroke of the piston, contacts with a roller 85 secured to the start lever 86. It should be noted however, that at the extreme ends of the stroke of the piston 81, the wedge 83 is clear of the roller 85, leaving the said roller and start lever 86 free to move upwardly by virtue of the pull exerted by the spring 88, when not otherwise restrained, thereby permitting the clutch disks 49a and 50a to engage for reverse rotation. In the course of the working stroke of the piston 81 in either direction, the wedge 83 forces the roller 85 and the start lever 86 downwardly pulling therewith the link 54 which acts through the shipper lever mechanism comprising members 52, 53 and 55 respectively, to move the shipper rod 51 to the left, thus engaging the clutch disks 49 and 50 for rotation in the forward direction. At the nethermost point of the aforementioned downward movement of the lever 86 a clutch latch 10 which is held in latching position against the action of a spring 10a engages and holds the lower extremity of an arm 53, thus preventing the said arm 53 from moving to the reverse direction position as would otherwise occur through the action of the spring 88 at the instant the wedge 83 moves beyond the roller 85. The aforementioned latching action which maintains the clutches in the position for forward rotation, persists during the entire inward or forward movement of the spindles and the coincident and proportionate counterclockwise rotation of the timing disk 39. A reverse stop member 40 is carried by the timing disk 39, the position of which on said disk may be adjusted to give a predetermined number of forward turns of the machine spindles.

The reverse stop 40 is provided with an extending portion 40a which is arranged to engage the adjacent end of the latch 10 and disengaging the said latch against the action of the spring 10a. The instant the latch 10 is disengaged by the stop 40 the clutch disks are moved into position for reverse rotation by the action of the spring 88 as previously described.

A particular feature of the invention resides in providing stop 40 with the cam surface 40b arranged to engage a boss 53a substantially integral with the arm 53, so as to force the shipper mechanism positively into the reverse position in the event of the clutches 49 and 50 becoming jammed in the position effecting forward rotation after the latch 10 has been tripped in the manner set forth above.

As the machine is disclosed in Fig. 3 of the drawings, the forward or radially inward movement of the spindles has been completed and the reverse stop 40 has just assumed a position wherein at the next increment of movement in a clockwise direction, the latch 10 will be tripped and the operation of the machine will be reversed. Simultaneous with the tripping of the latch 10, the timing disk 39 rotates in a clockwise direction coincidentally with and proportionately to, the backing out of the machine spindles until a cam surface 41a on the neutral stop 41, which is permanently attached to the face of the timing disk 39 opposite that on which the adjustable reverse stop 40 is mounted engages a boss 55a substantially integral with the arm 55 and moves the shipper rod 51 to a neutral position, overcoming the effort exerted by the spring 88 to maintain the aforementioned shipper rod in the reverse position.

When the aforementioned movement of the shipper lever mechanism comprising members 52, 53 and 55 respectively and the shipper rod 51 are moved into neutral position subsequent to the completion of the outward movement of the spindles, two other movements of the machine occur simultaneously. First, a brake band 59 is automatically tightened about a brake drum 58 formed integral with the beveled reverse pinion 43a, the said brake band 59 being actuated by means of a cam 60 mounted on the low speed spur gear 37 of the timing gear train and merely acting as a check against drift or overtravel for the backout or outward movement of the driven members of the machine due to the momentum thereof. Secondly, a pawl 62, also mounted on the low speed gear wheel 37 of the timing gear train, engages one lobe 63 of a star wheel 64 mounted on the stem 65 of a four way valve 66 actuating the said valve through one quarter of a complete revolution and affords connection through the pipe 67 or 67a as the case may be, to a cylinder 68 operating the automatic chucking and starting mechanism.

It should be noted at this point however, that the operation instituted by means of the cylinder 68, could equally well be accomplished by the use of a reversing motor, and it should be further noted that the aforementioned star wheel 64 moves continuously in one direction in quadrantal steps for the successive operations. The arrangement of the pipes 67 and 67a with respect to the cylinder 68 and the valve 66 is such that when the pipe 67 is a high pressure line, the pipe 67a becomes an exhaust line and vice-versa with the result that each quadrantal turn of the star wheel 64 results in a movement of the piston in one direction or the other. The rapidity of movement of the above piston is controllable manually at will by means of a needle valve 69 connected to the exhaust port of the valve 66.

The aforesaid piston of the cylinder 68 is provided with a piston rod 70 terminating in a tooth rack 71 formed on the outer end thereof, the teeth of which engage a pinion 72 mounted on a shaft 73. A crank disk 74 is, in a similar manner, mounted on the said shaft 73 and is provided with an adjustable connecting rod 75, connected intermediate the said disk 74 and the chucking mechanism for the purpose of actuating said mechanism and, inasmuch as the details of the chuck and the chuck actuating mechanism, beyond the point of contact of the connecting rod 75, are sufficiently covered by the aforementioned patents granted to John R. Saylor of Pottstown, Pennsylvania, a detailed description thereof is deemed unnecessary.

A pin 76 is mounted on the rear of the aforementioned crank disk 74 and is suitably positioned to engage a handle 77 at the completion of each revolution of the said disk, the said handle 77 comprising an element of a four way valve 78, which in the present instance is arranged to control the passage of fluid or air through the pipe 79, 79a, as the case may be, to a starting cylinder 80, the operation of which has been set forth above. Inasmuch as the piston of the cylinder 68, rod 70, and the rack 71, alternate in direction, i. e., in a reciprocating manner on successive working strokes, the direction of the shaft 73 and the crank disk 74 likewise alternate, resulting in the handle 77 being moved alternately upward and downward. The aforementioned valve 78 is so constructed, that on the reciprocating movement of the parts just described, the pipes 79, 79a become alternately pressure pipes to, and exhaust pipes from the cylinder 80, thus making the piston 81 and the wedge 83 connected thereto, alternate in direction on the successive working operations thereof.

The rotation of the shaft 73 and the crank disk 74 is limited to substantially one revolution, the arc through which the said shaft rotates, being accurately determined by an adjustable stop at the upper end of the cylinder 68, thus terminating the upward movement of the piston within the said cylinder. A similar adjustable stop is also provided and attached to the pedestal on which the cylinder 68 is mounted, the said stop functioning to limit the downward travel of the rod 70 and the rack 71.

It should be noted that regardless of the alternate direction of rotation of the shaft 73 and the disk 74, each revolution of the said shaft results in a complete reciprocation of the connecting rod 75. The alternate direction of rotation of the shaft 73 creates several distinct advantages; first, every stroke of the piston of the cylinder 68 is a working stroke, making it unnecessary to return the said piston to its original position for a repetition of the operating cycle and thereby reduces to a minimum, the consumption of air or fluid required in the operation of the machine. Secondly, when a fitting or other work becomes jammed in feeding, further movement of the shaft 73 is precluded by the stalling of the piston in the cylinder 68.

Provision is made for manual, as well as automatic operation of the star wheel 64 of the valve 66, so that in the occurrence of a jam during feeding, a one quarter turn of the star wheel 64 manually, will reverse the direction of the piston of the cylinder 68 and reverse the partially completed rotation of the shaft 73, changing the direction from that in which the jamming occurred and consequently clearing such a jam instantly. Also, when such a jam occurs, the pin 76, carried on the rear face of the disk 74, fails to engage the handle 77 of the valve 78, and the starting cylinder 80 remains inoperative, thus insuring against the starting of the machine spindles through a working cycle at a time when damage would result from the improper position of the chucks.

While I have set forth the embodiment of my invention for the purpose of description, it will be apparent that certain modifications and detailed changes may be made thereto without departing from the invention, except as set forth in the appended claims.

I claim:

1. In a machine, the combination with threading means and a chuck, of means driving said threading means in forward and reverse direction, a piston, means operative in timed relation with said driving means controlling the direction of movement of said piston, a rotatable disk, means carried by said piston for rotating said disk in alternate directions during successive strokes of the piston, a second piston, means carried by said latter piston effecting forward rotation of the driving means during each stroke of the piston, means operatively connecting the disk and the chuck for actuating the latter, and means also carried by the disk for starting and controlling the direction of movement of the second piston in timed relation with the driving means and the chuck mechanism.

2. In a machine, the combination with a threading means, and a chuck, of means driving said threading means in forward and reverse direction, a piston, means operative in timed relation with said driving means controlling the direction of movement of said piston, means associated with said time controlled means for regulating the speed of operation of the piston at will, a rotatable disk, means carried by said piston for rotating said disk in alternate directions during successive strokes of the piston, a second piston, means carried by said latter piston effecting forward rotation of the driving means during each stroke of the piston, means operatively connecting the disk and the chuck for actuating the latter, and means also carried by the disk for starting and controlling the direction of movement of the second piston in timed relation with the driving means and the chuck mechanism.

3. In a machine, the combination with threading means and a chuck, of means for driving said threading means in forward and reverse direction, means for operating the chuck in timed relation with said driving means, a piston, means operated by said piston effecting forward rotation of the driving means during each stroke of said piston, and means operated by the chuck actuating means for starting and controlling the direction of movement of the piston in timed relation with the driving means and chuck mechanism.

4. In a machine, the combination with threading means and a chuck, of means driving said threading means in a forward and reverse direction, a piston, a valve operated by said driving means, effecting movement of said piston, a disk, a rack carried by the piston effecting rotation of said disk substantialy one revolution in alternate directions during successive strokes of the piston, a second piston, means carried by the latter piston, effecting forward rotation of the threading means during one stroke thereof, a second valve operated by the disk effecting movement of the second piston in timed relation with the chuck, and means operatively connecting the disk and the chuck for actuating the latter.

5. In a machine comprising a spindle, a chuck, clutch means effecting forward and reverse rotation of said spindle, a clutch lever, a driving gear, a timing disk rotatable therewith, a piston, means carried by said piston moving the clutch into engagement effecting forward rotation of the spindle, latch means, means engaged by said latch maintaining the clutch in engagement during entire forward movement of the spindle, means carried by the disk arranged to disengage the latch and engage the lever to move the clutch into engagement effecting reverse rotation of the spindle, means also mounted on the disk effecting movement of the clutch lever to neutral position after rotation of the spindle in reverse direction, a brake, means carried by the disk for tightening the brake to prevent over-travel of the driven members of the machine immediately the clutch lever is moved to neutral position, means carried by the driving gear effecting timed operation of the chuck and means controlled by the chuck actuating means effecting timed operation of the clutch actuating means.

6. In a machine, the combination with threading means and a chuck, of driving means for said threading means, timing means driven by the threading drive means, a fluid actuated piston for actuating the chuck, a valve controlled by said timing means to actuate said fluid actuated piston in alternate directions to open and close the chuck, and means controlled directly by the fluid actuated piston to effect operation of the threading drive means in timed relation with the chuck.

7. In a machine, the combination with threading means and a chuck, of driving means for said threading means, a fluid actuated piston for actuating said chuck, a valve to actuate the fluid actuated piston in opposite directions to open and close the chuck, means driven by the driving means for actuating the valve to control the operation of the fluid actuated piston, and means controlled by the fluid actuated piston for controlling the driving means in timed operation with the chuck.

8. In a machine comprising threading means and a chuck, driving means for said threading means, means for operating said chuck, means for actuating said chuck operating means in alternate directions, means controlled by said driving means for automatically controlling the direction of movement of said chuck actuating means, said last-mentioned means being further operable independently of the driving means for the purpose of reversing the direction of movement of the chuck actuating means at will to release work which may have jammed in the chuck during a chucking operation.

9. In a machine comprising threading means and a chuck, driving means for said threading means, means for operating said chuck, means for actuating said chuck operating means in alternate directions, means actuated intermittently in the same direction by said driving means for automatically controlling the direction of movement of said chuck actuating means, said last mentioned means being further operable independently of the driving means for the purpose of reversing the direction of movement of the chuck actuating means at will to release work which may have jammed in the chuck during a chucking operation.

10. In a machine comprising threading means and a chuck, driving means for said threading means, means for operating said chuck, means for actuating said chuck operating means in alternate directions, means controlled by said driving means for automatically controlling the direction of movement of said chuck actuating means, said last-mentioned means being further operable independently of control by said driving means for the purpose of reversing the direction of movement of the chuck actuating means at will to release work which may have jammed in the chuck during a chucking operation, and means controlled by the chuck operating means effecting timed operation of the driving means.

11. In a machine comprising threading means and a chuck, driving means for said threading means, means operable in alternate directions to open and close the chuck, means actuated intermittently in the same direction for controlling the direction of movement of said chuck operating means in timed relation with said driving means, and means controlled by the chuck actuating means effecting timed operation of the driving means.

12. In a machine comprising threading means and a chuck, driving means for said threading means, a fluid actuated piston operable in alternate directions to open and close the chuck, a rotary valve actuated intermittently in the same direction for controlling the direction of movement of said fluid actuated piston, a second fluid actuated piston operable in alternate directions to control the drive means, and a second valve actuated in alternate directions by the first fluid actuated piston to control the operation of said second fluid actuated piston.

13. In a machine, the combination with threading means and a chuck, of driving means for said threading means, timing means associated with the driving means, a fluid actuated piston operable in alternate directions to open and close the chuck, means operated by said timing means controlling the direction of movement of said fluid actuated piston, means for controlling the driving means, and means operated by said fluid actuated piston for controlling the operation of the drive control means.

14. In a machine, the combination with threading means and a chuck, of driving means for said threading means, timing means associated with the driving means, a fluid actuated piston operable in alternate directions to open and close the chuck, a valve actuated intermittently in the same direction by said timing means controlling the direction of movement of said fluid actuated piston, means for controlling the driving means, and means operated by the fluid actuated piston for controlling the operation of the drive control means.

15. In a machine comprising threading means and a chuck, driving means for said threading means, clutch means effecting alternately forward and reverse rotation of said driving means, timing means controlled by the driving means, means operable to actuate the clutch into engagement effecting forward rotation of the driving means, means carried by the timing means arranged to engage the clutch effecting reverse rotation of said driving means, means controlled by said timing mechanism effecting timed operation of the chuck, and means controlled by the chuck actuating means effecting timed operation of said clutch actuating means.

16. In a machine comprising threading means and a chuck, of driving means for said threading means, clutch means effecting forward and reverse rotation of said driving means, timing mechanism associated with said drive means, means operable to move the clutch into engagement effecting forward rotation of the drive means, means maintaining the clutch in engagement during the entire forward movement of the threading means, means carried by said timing mechanism arranged to move the clutch into engagement effecting reverse rotation of the threading drive means, means effecting movement of the clutch to neutral position after rotation of the threading means in reverse direction, means controlled by said timing mechanism effecting timed operation of the chuck, and means controlled by the chuck actuating means effecting timed operation of the clutch actuating means.

HERBERT S. EADES.